G. MERCER & J. HINTON.
APPARATUS FOR TEMPERING SAW PLATES AND SIMILAR ARTICLES OF STEEL.
No. 77,396. Patented Apr. 28, 1868.
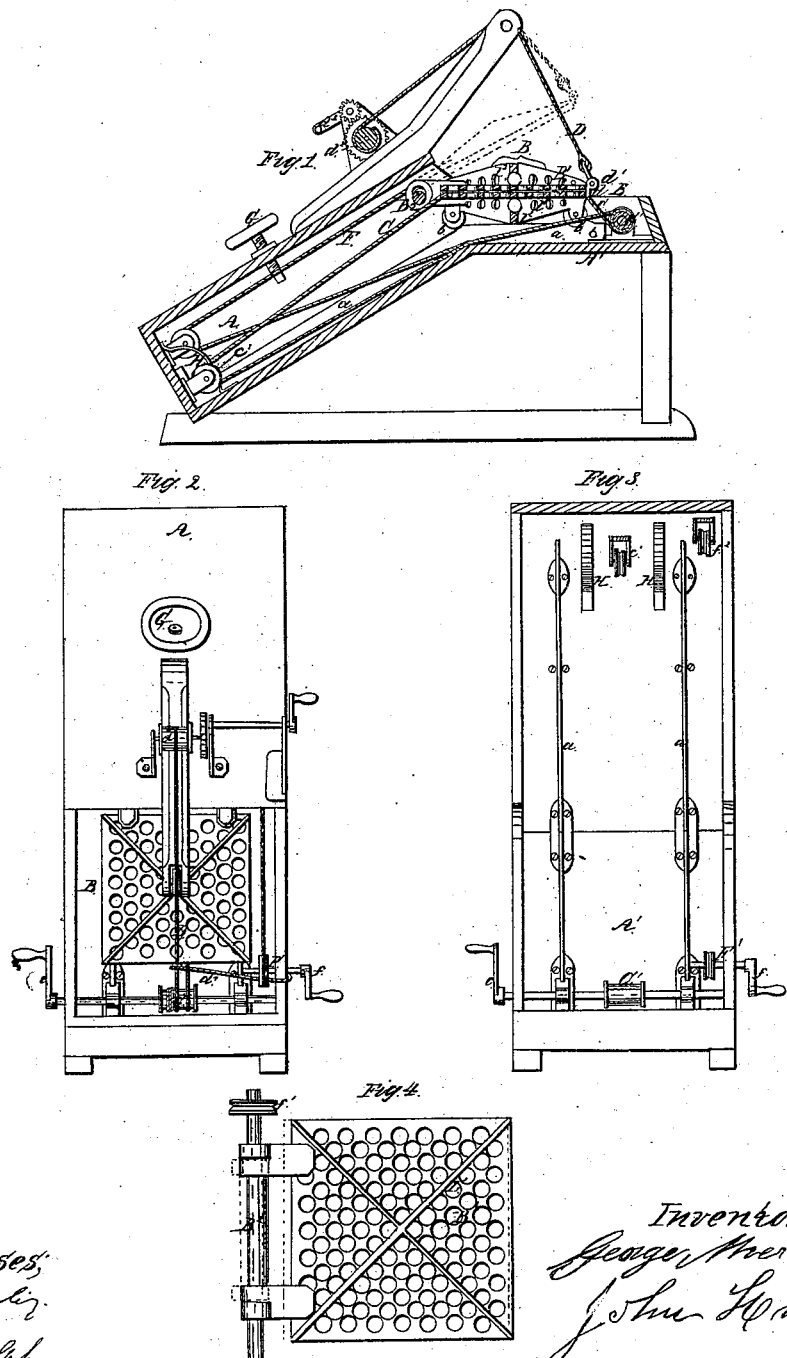

United States Patent Office.

GEORGE MERCER AND JOHN HINTON, OF ST. LOUIS, MISSOURI.

Letters Patent No. 77,396, dated April 28, 1868.

IMPROVED APPARATUS FOR TEMPERING SAW-PLATES AND SIMILAR ARTICLES OF STEEL.

*The Schedule referred to in these Letters Patent and making part of the same.*

TO ALL WHOM IT MAY CONCERN:

Be it known that we, GEORGE MERCER and JOHN HINTON, of St. Louis, in the county of St. Louis, and State of Missouri, have made certain new and useful Improvements in Apparatus for Tempering Saws and other Thin Plates of Steel; and we do hereby declare that the following is a full and clear description thereof, reference being had to the accompanying drawings, and to the letters of reference marked thereon.

This apparatus consists of a device for clamping the plates before and during the tempering operation, and also certain devices for submerging the carriage and the clamped plates into the bath, and also certain other devices for straightening and securing the plates, which will be hereinafter more fully explained.

To enable those skilled in the art to make and use our improved apparatus, we will proceed to describe its construction and operation.

Figure 1, of the drawings, is a longitudinal sectional elevation of the improved apparatus.

Figure 2 is a plan of the same.

Figure 3 is a sectional plan of the apparatus, showing the ways on which the carriage sustaining the plates descends into the bath.

Figure 4 is a plan of the carriage, which secures and clamps the plates.

The bath-tub A is a shallow vessel, usually of wrought iron, wholly enclosed, with the exception of one end, and set on a frame at an angle of inclination of about thirty degrees (more or less) with a horizontal plane, the open end being the elevated one. A horizontal platform, A', is placed at the upper end of the box or bath-tub, and in contact with the floor thereof, so that the ways or tracks $a$, on which the carriage B runs, are easily curved over from the floor of the bath-tub to the said platform. The carriage B rests on small wheels or sheaves, $b$, which run on the tracks $a$. The said carriage B consists of a horizontal, or, rather, flat perforated plate, $b^1$, strengthened by means of the external ribs $b^2$, which cross the said plate diagonally, and thereby secure the centre of it from springing or bulging out of a true line. The cap $B^1$ is similar in construction to the bed-plate or carriage B, having similar stiffening-ribs, $b^3$. The cap $B^1$ is hinged to the plate B by means of the eccentric-shaft $B^2$. When a saw or plate is to be tempered in this apparatus, the carriage B $B^1$ is to be drawn up on the platform A' by means of the endless rope or chain C, which is operated by the roller C' and crank $c$. This same rope or chain passes over a sheave, $c'$, at the bottom of the bath-tub, and also serves as a means to run the carriage down into the bath. When the carriage is up on the said platform A', the rope or chain D is to be attached to the clevis $d$ by means of the pin $d^1$, the said clevis $d$ being attached to the cap-plate $B^1$, which is then raised up like an open door, as is indicated by the red lines in fig. 1, by simply winding the rope D up around the crab $d^2$ by turning the crank $d^3$. The plate E, which is to be tempered, is then to be placed, red hot, on the flat surface of the carriage or plate B, and the cap $B^1$ is to be let fall suddenly on the plate thus placed, by withdrawing the pin $d^1$, which is accomplished by jerking the cord, $d^4$, attached to the said pin.

The cap $B^1$, being of considerable weight, will, when released in this manner, fall with such force on the plate E as to straighten it of all kinks or bends. Of course, the two adjacent surfaces of the plates B, $B^1$, should be made perfectly true for this purpose. When the plate E has been thus confined on its carriage, the whole apparatus will be submerged in the bath by drawing it down by means of the cord or chain C, roller C', and crank $c$. While submerged in the bath, the tempering or hardening-fluid will find access to every part of the plate, through the perforations of B and $B^1$. Lest the plate E should be too closely confined between its clamping-plates B and $B^1$, the cap-piece $B^1$ is given a reciprocating sliding motion, by means of its eccentric coupling-shaft, $B^2$, as is shown by the dotted lines in fig. 4.

The shaft $B^2$ is revolved about its axis by means of the endless chain or rope F, which is actuated by the roller F' and crank $f$. The said chain or rope F passes over a grooved wheel, $f^1$, affixed to the end of the shaft $B^2$, and also around a similar wheel, $f^2$, placed at the bottom of the bath-tub, and thus the required motion of the cap $B^1$ may be produced at any position of the said carriage. If the weight of the cap $B^1$ should not prove sufficient to straighten the plate E by letting it fall thereon, as has already been described, a set-screw, G, is provided in the top of the bath-tub, which may be screwed down on top of the cap $B^1$, so as to press the plate into the required form while it is submerged. Springs H are placed at the bottom end of the bath-tub, in such positions as to receive the shock of the carriage when descending thereinto.

Having described our invention, what we claim is—

1. The carriage B B$^1$, when constructed of perforated plates, and the trussing-ribs $b^2$, $b^3$, substantially as shown and described.

2. We claim the combination and arrangement of the cap B$^1$, rope or chain D, clevis $d$, and pin $d^1$, and crab $d^2$, all arranged and operated as described and set forth, for the purpose of clamping and straightening the plates E.

3. We claim the cap B$^1$, when combined eccentrically with the carriage B, by means of the eccentric-shaft B$^2$, and operated by the chain or rope F, roller F', and crank $f$, for the purpose of exposing the whole surface of the plate to the action of the tempering-fluid.

4. We claim the springs H, when arranged in combination with the bath-tub A, as herein described and set forth.

5. We claim the set-screw G, when employed in connection with the tub A and carriage B B$^1$, as described and set forth.

GEORGE MERCER,
JOHN HINTON.

Witnesses:
M. RANDOLPH,
H. PAULI.